United States Patent [19]
Kozhevnikov et al.

[11] Patent Number: 5,873,444
[45] Date of Patent: Feb. 23, 1999

[54] COMBINED CLUTCH-BRAKE MECHANISM

[75] Inventors: Victor A. Kozhevnikov, 26-36, V1.Nevskogo St., Voronezh 394088; Eugene V. Kozhevnikov, Voronezh; Vladimir M. Vovkotroub, Voronezh; Leonid P. Nesterov, Voronezh, all of Russian Federation

[73] Assignee: Victor A. Kozhevnikov, Russian Federation

[21] Appl. No.: 905,552

[22] Filed: Aug. 4, 1997

[51] Int. Cl.$^6$ .............................. F16D 67/04; F16D 13/75
[52] U.S. Cl. ............... 192/18 A; 192/70.25; 192/85 AA; 188/717
[58] Field of Search ................. 192/18 A, 12 C, 192/70.25, 85 AA, 18 R, 87.16, 48.91, 111 R; 188/196 M, 196 V, 71.7

[56] References Cited

U.S. PATENT DOCUMENTS

| 2,747,714 | 5/1956 | Eason | 192/18 A |
|---|---|---|---|
| 2,942,708 | 6/1960 | Eason | 192/18 A |
| 3,000,478 | 9/1961 | Carter | 192/18 A |
| 3,200,917 | 8/1965 | Herr | 192/18 A |
| 3,432,014 | 3/1969 | Mayuki | 192/18 A |
| 3,469,664 | 9/1969 | Ortlinghaus | 192/18 A |
| 4,807,731 | 2/1989 | Collins | 192/12 C X |
| 4,874,068 | 10/1989 | Collins et al. | 192/18 A |
| 5,257,684 | 11/1993 | Collins | 192/18 A X |

FOREIGN PATENT DOCUMENTS

| 490980 | 5/1976 | U.S.S.R. | 192/18 A |
|---|---|---|---|
| 1143909 | 3/1985 | U.S.S.R. | 192/18 A |

*Primary Examiner*—Charles A. Marmor
*Assistant Examiner*—Ankur Parekh
*Attorney, Agent, or Firm*—Dougherty & Associates

[57] ABSTRACT

An improved combined clutch and brake apparatus is disclosed having a pressure disk positioned on a hub between a brake thrust disk and a pneumatic cylinder. The present invention is configured to allow the apparatus to be efficiently serviced. The brake thrust disk forms an outer surface of the invented combined clutch and brake apparatus. A movable piston positioned in a casing of the pneumatic cylinder forms an external face of the invented combined clutch and brake apparatus. This arrangement allows failed sealing collars sealing the piston to the casing to be efficiently replaced. Readily accessible screws also allow clearances between the pressure disk and the brake thrust disk and between the pressure disk and a clutch thrust ring to be efficiently maintained at optimal levels via stepless adjustment from either side of the invented combined clutch and brake mechanism or from both sides. This is particularly important because friction elements which engage the driven disks are subject to extensive wear and therefore continuously alter the clearances. Finally, a bolt connecting the piston to the pressure disk allows the length the piston is free to travel to be efficiently adjusted as desired.

24 Claims, 4 Drawing Sheets

COMBINED CLUTCH-BRAKE MECHANISM

FIELD OF THE INVENTION

The present invention relates to a clutch and brake combination for mechanical presses and other press-forging machines. More particularly, the present invention relates to a combined clutch and brake apparatus having an extended service life and providing improved accessibility for maintenance.

BACKGROUND OF THE INVENTION

Combined clutch and brake mechanisms are used for driving power presses in which the movement of a crank or eccentric shaft must be stopped immediately after the clutch is disengaged. Combined clutch and brake mechanisms are designed such that, when the clutch is engaged, the brake is automatically disengaged, and, when the brake is engaged, the clutch is automatically disengaged.

Combined clutch and brake mechanisms utilize friction linings or friction elements which are engageable with a clutch disk and a brake disk. Friction elements undergo extensive wear during use and frequently must be replaced. Friction element wear is particularly problematic because any variation in the clearance between the friction element and the clutch disk seriously affects the proper functioning of the clutch. Similarly, any variation in the clearance between the friction element and the brake disk seriously affects the proper functioning of the brake. As a consequence, a prescribed clearance between the linings and the disks must be maintained to enable the combined clutch and brake mechanism to operate properly.

Existing combined clutch and brake mechanisms are difficult to service. Adjusting the clearances between the friction elements and the brake and clutch disks on those mechanisms requires numerous time-consuming steps. Replacing worn friction elements is also a time-consuming process. To replace a friction elements, the entire mechanism must be completely disassembled, the friction elements replaced, and the mechanism must then be reassembled. Consequently, existing combined clutch and brake mechanisms are subject to significant down time.

A need therefore exists for a combined clutch and brake mechanism that permits the clearances between the friction elements and the clutch and brake disks to be quickly and easily adjusted and allows worn friction elements to be efficiently replaced.

In addition, existing combined clutch and brake mechanisms are prone to mechanical failure as the difficulties in accessing the friction elements unduly delays their replacement. This is particularly problematic where one of the sealing collars which secure the piston in the casing of the pneumatic cylinder fails and the piston is no longer able to move the clutch into an engagement position.

A need exists for a combined clutch and brake mechanism that allows for easy maintenance of parts requiring replacement.

During operation, frequent adjustments must be made to the length of the piston stroke in the pneumatic cylinder of a combined clutch and brake mechanism. Existing combined clutch and brake mechanisms require that the entire mechanism be disassembled before the stroke length can be adjusted and reassembled after the adjustment is made. This also is time-consuming and subjects existing clutch and brake mechanisms to significant down-time.

Therefore, a need exists for a combined clutch and brake mechanism having an increased service life and having improved performance, particularly under emergency conditions.

DESCRIPTION OF THE PRIOR ART

Applicant is aware of the following U.S. Patents concerning combined clutch and brake mechanisms for mechanical presses and other press-forging machines.

| U.S. Pat. No. | Inventor | Issue Date | Title |
| --- | --- | --- | --- |
| 3,432,014 | Iwamatsu et al. | Feb. 20, 1967 | CLUTCH AND BRAKE COMBINATION |
| 3,200,917 | Herr et al. | May 14, 1963 | AIR COOLED COMPACT CLUTCH AND BRAKE |
| 3,469,664 | Ortlinghaus et al. | July 13, 1967 | COMBINED COUPLING AND BRAKE MECHANISM |

An existing clutch and brake combination is disclosed in U.S. Pat. No. 3,432,014. The U.S. Pat. No. 3,432,014 mechanism consists of a brake thrust disk, a pressure disk, a clutch thrust disk, a pneumatic cylinder having a body with movable pistons each sealed by sealing collars, an axially movable frictional driving clutch disk having friction elements, an axially movable frictional driving brake disk also having friction elements, and a unit consisting of an adjustment nut having a locking device to prevent axial rotation for stepless adjustment of clearances between the frictional driving clutch disk and the frictional driving brake disk to compensate for wear of the friction elements.

The U.S. Pat. No. 3,432,014 mechanism has numerous disadvantages including a short service life and difficult maintenance conditions during the operation of the mechanism. First, because both the brake thrust disk and the clutch thrust disk have substantially larger diameters than the disks of other clutch and brake mechanisms, the brake thrust disk and the clutch thrust disk are exposed to increased moments of inertia. Those forces reduce the life span of the mechanism. Second, the location of the pneumatic cylinder pistons in the friction assembly is problematic for servicing a worn out or failed sealing collar. To replace a sealing collar, the unit must be completely disassembled and the pneumatic pitons removed before the sealing collars can be accessed.

In addition, installation of the unit for stepless adjustment of clearances between the frictional disks in the clutch and the brake using an adjustment nut interacting with the working shaft and the pneumatic cylinder casing is impractical and results in reduced service life of the mechanism. Frequent alternating loads, 40–50 per minute, during single engagements of the friction assembly causes the forces from the pneumatic cylinder to be transferred through the pneumatic cylinder base to the threaded connection of the small diameter adjustment nut to damage its threads. The damage to the threads loosens the threaded connection and results in a reduction of the service life of the mechanism and a decrease in the reliability of the performance of the mechanism.

Another existing clutch and brake combination is disclosed in U.S. Pat. No. 3,200,917. The U.S. Pat. No. 3,200,917 mechanism has a hub and the following parts kinematically connected with it: a brake thrust disk, a pressure disk, a clutch thrust disk, a pneumatic cylinder having a movable pistons positioned inside a casing and sealed by collars, an axially movable frictional driving clutch disk having friction elements, an axially movable frictional driving brake disk, and a unit for stepless adjustment of changing clearances between the frictional driving clutch disk and the frictional driving brake disk resulting from wear to the friction elements.

The U.S. Pat. No. 3,200,917 mechanism has numerous disadvantages. This mechanism has a short service life as a result of the need for frequent replacements of the pneumatic cylinder sealing collars. The sealing collars are prone to disintegration and failure as a result of exposure to excessive heat radiating through the pressure disks connected to the piston body. The excessive heat is created during acceleration and braking of the driven parts when the clutch and brake mechanism is engaged.

Furthermore, the imperfection and the complexity of the design of this clutch and brake mechanism makes its service during operation very difficult. In order to replace a worn out or failed sealing collar, it is necessary to perform labor intensive disassembly and then reassembly of most of the main parts of the clutch and brake mechanism.

The U.S. Pat. No. 3,200,917 mechanism has the brake thrust disk positioned at the protruding end of a long shaft anchored in the clutch thrust disk. This serves as a cantilever. The frequent alternating loads, 40–50 per minute, during a single operating mode of the friction assembly weakens the mounting and results in a reduction of the service life of the mechanism and a decrease in the reliability of the performance of the mechanism.

In addition, the small diameter of the pneumatic cylinder in the U.S. Pat. No. 3,200,917 requires that the clutch and brake mechanism operate at high compressed air pressures in the air pipes. The pressure must be no less than 5.5–6.0 atmospheres in order to provide the required amount of torque and a sufficient braking moment of the combined clutch and brake mechanism.

Finally, locating the braking springs only a short distance from the central axis of the unit limits the number of springs that can be used. Because of the space restriction, not more than 5 or 6 springs can be installed. Consequently, the small number of springs limits the amount of braking torque that can be generated which reduces the reliability and safety of the combined clutch and brake mechanism.

A further existing clutch and brake combination is disclosed in U.S. Pat. No. 3,469,664. The U.S. Pat. No. 3,469,664 mechanism has a hub non-rotatably mounted on a shaft which is driven intermittently by the clutch mechanism.

The U.S. Pat. No. 3,469,664 mechanism has the same disadvantages as those described about the U.S. Pat. No. 3,200,917 mechanism. In addition, the absence of a unit for stepless adjustment of changing clearances between the frictional driving clutch disk and the frictional driving brake disk resulting from wear to the friction elements leads to an increase in the distance the pistons travel. The increased piston travel leads to an increase in the length of the brake springs during the braking period of the driven parts. This results in a decrease in the amount of braking torque achievable by the combined clutch and brake mechanism. Consequently, the low level of braking torque reduces the safety of the mechanism during emergency operations.

Applicant is also aware of the following foreign patents concerning clutch mechanisms and brake mechanisms for mechanical presses and other press-forging machines.

| Pat. No. | Country | Inventor | Issue Date |
|---|---|---|---|
| 1,019,247 | Great Britain | Herr et al. | Nov. 9, 1962 |
| 1,207,725 | Germany | Herr et al. | Nov. 9, 1961 |
| 451,613 | Switzerland | Ortlinghaus et al. | July 10, 1967 |
| 1,172,578 | Great Britain | Ortlinghaus et al. | July 14, 1967 |
| 011,805 | Germany | Ortlinghaus et al. | July 14, 1966 |

British Patent No. 1,019,047 and German Patent No. 1,207,725 correspond to U.S. Pat. No. 3,200,917.

Swiss Patent No. 451,613, British Patent No. 1,172,578 and German Patent Application No. 011,805 correspond to U.S. Pat. No. 3,469,664.

SUMMARY OF THE INVENTION

The present invention overcomes the shortcomings of existing clutch and brake mechanisms by providing a combined clutch and brake apparatus that can operate safely and efficiently for extended periods of time without requiring significant time-consuming service.

The combined clutch and brake apparatus of the present invention includes a brake thrust disk, a pressure disk, a clutch thrust ring, and a pneumatic cylinder kinematically connected to a hub. The hub is non-rotatably mounted on a shaft that is driven intermittently by the clutch.

The brake thrust disk is positioned at an end of the hub opposite the pneumatic cylinder. The brake thrust disk forms an outer surface of the invented combined clutch and brake apparatus. Between the brake thrust disk and the pneumatic cylinder, a pressure disk is mounted on splines on the outer surface of the hub which allow the pressure disk to move axially along the length of the hub.

The pneumatic cylinder includes a casing slidably mounted on the hub and a movable piston positioned in an annular cavity formed by the casing. In the present invention, the pneumatic cylinder is oriented such that the casing is adjacent to the pressure disk. The piston therefore serves as the other outer surface of the invented combined clutch and brake apparatus opposite the brake thrust disk. Consequently, no additional housing is necessary for either side of the invented clutch and brake apparatus. This allows easy access for service from either end of the apparatus.

Sealing collars seal an internal space between the piston and the casing. Because sealing collars are prone to failure, the present invention permits the sealing collars to be readily accessed and, therefore, efficiently replaced. The orientation of the pneumatic cylinder allows the sealing collars to be accessed without requiring the pneumatic cylinder to be removed from the apparatus.

Furthermore, the invented apparatus has both superior ventilation capabilities and a low inertia. This allows the present to operate at over one hundred engagements per minute well above the performance levels of existing combined clutch and brake mechanisms.

During normal operation, a compressed gas is fed into the internal space between the piston and the casing. This causes the piston to move axially away from the casing. Because the piston is secured to the pressure disk by means of bolts, the pressure disk also moves with the piston and consequently moves toward the clutch thrust ring positioned on an internal surface of the pneumatic cylinder casing. As the pressure disk approaches the casing, the clutch is engaged.

When pressure is released from the internal space between the piston and the casing, braking springs push the pressure disk away from the clutch thrust ring thereby disengaging the clutch. The braking springs then press the pressure disk against the brake thrust disk thereby engaging the brake.

Friction elements are located on both sides of a brake friction ring positioned between the pressure disk and the brake thrust disk. Friction elements are also located on both sides of a clutch friction ring positioned between the pressure disk and the clutch thrust ring. The friction elements are subject to extensive wear during operation of the invented combined clutch and brake apparatus.

As a consequence of wear of the friction elements, the prescribed clearances between the friction elements and their corresponding surfaces must be maintained in order for the invented combined clutch and brake apparatus to operate properly. The present invention allows the clearances to be efficiently adjusted from either the clutch side or the brake side of the invented combined clutch and brake apparatus to maintain the proper clearances.

From the brake side of the invented combined clutch and brake apparatus, the clearances between the brake friction ring can band the brake friction ring can be adjusted as follows. First, bolts in the adjustment nut are unscrewed thereby allowing diametrically opposed T-shaped stops are removed from radial openings in the adjustment nut. The lower ends of the T-shaped stops are then removed from notches formed in the outer surface of the brake thrust disk. Next, an adjustment nut is rotated as far as required to adjust the clearances between the brake thrust disk and the brake friction ring. The T-shaped stops are reinstalled and positioned in the radial openings of the adjustment nut so that the lower ends of the stops enter the circular grooves in the outer surface of the brake thrust disk. The bolts are then screwed into the openings in the adjustment nut.

From the clutch end of the invented combined clutch and brake apparatus, the clearances between the clutch thrust ring and the brake friction ring can be adjusted as follows. First, three thrust ring bolts which abut the casing are loosened and three other thrust ring bolts which extend into the casing are unscrewed from threaded openings in a thrust ring. Next, gage adjustment washers are removed from between the heads of the three second thrust ring bolts and the thrust ring. The three second thrust ring bolts are then screwed into the threaded openings until their free ends abut the external surface of the casing of the pneumatic cylinder.

When a set of gage adjustment washers are removed, the bolts bring the casing closer to the pressure disk at a distance equal to the thickness of the washers removed from the bolts. As a result, the distance between the pressure disk and the clutch thrust ring is reduced and the clearances between the first clutch friction elements and the pressure disk and the clearances between the second clutch friction elements and the clutch thrust ring and disks are adjusted.

Often it is necessary to adjust the axial travel of the piston in the annular cavity of the casing. The present invention allows the axial travel of the piston to be adjusted by removing check-nuts from the bolts connecting the pressure disk to the pneumatic cylinder. Adjustment washers can then be removed or added as necessary. The check-nuts are then replaced on the bolts. Removing adjustment washer reduces the distance between the piston and the pressure disk thereby decreasing the length the piston can travel axially away from the pressure disk.

OBJECTS OF THE INVENTION

The principal object of the present invention is to provide an improved combined clutch and brake apparatus that can be efficiently operated.

A further object of the invention is to provide an improved combined clutch and brake apparatus that can be efficiently maintained.

Another object of the invention is to provide an improved combined clutch and brake apparatus that allows easy stepless adjustment of clearances formed as a result of the wear of friction elements.

Another object of the invention is to provide an improved combined clutch and brake apparatus that allows easy adjustment to the distance that the movable piston will travel in the pneumatic cylinder.

Another object of the invention is to provide an improved combined clutch and brake apparatus that allows easy the sealing collars to be efficiently replaced.

Another object of the invention is to provide an improved combined clutch and brake apparatus that has an increased service life and safety level.

BRIEF DESCRIPTION OF THE DRAWINGS

The foregoing and other objects will become more readily apparent by referring to the following detailed description and the appended drawings in which.

DETAILED DESCRIPTION

Figure 1:
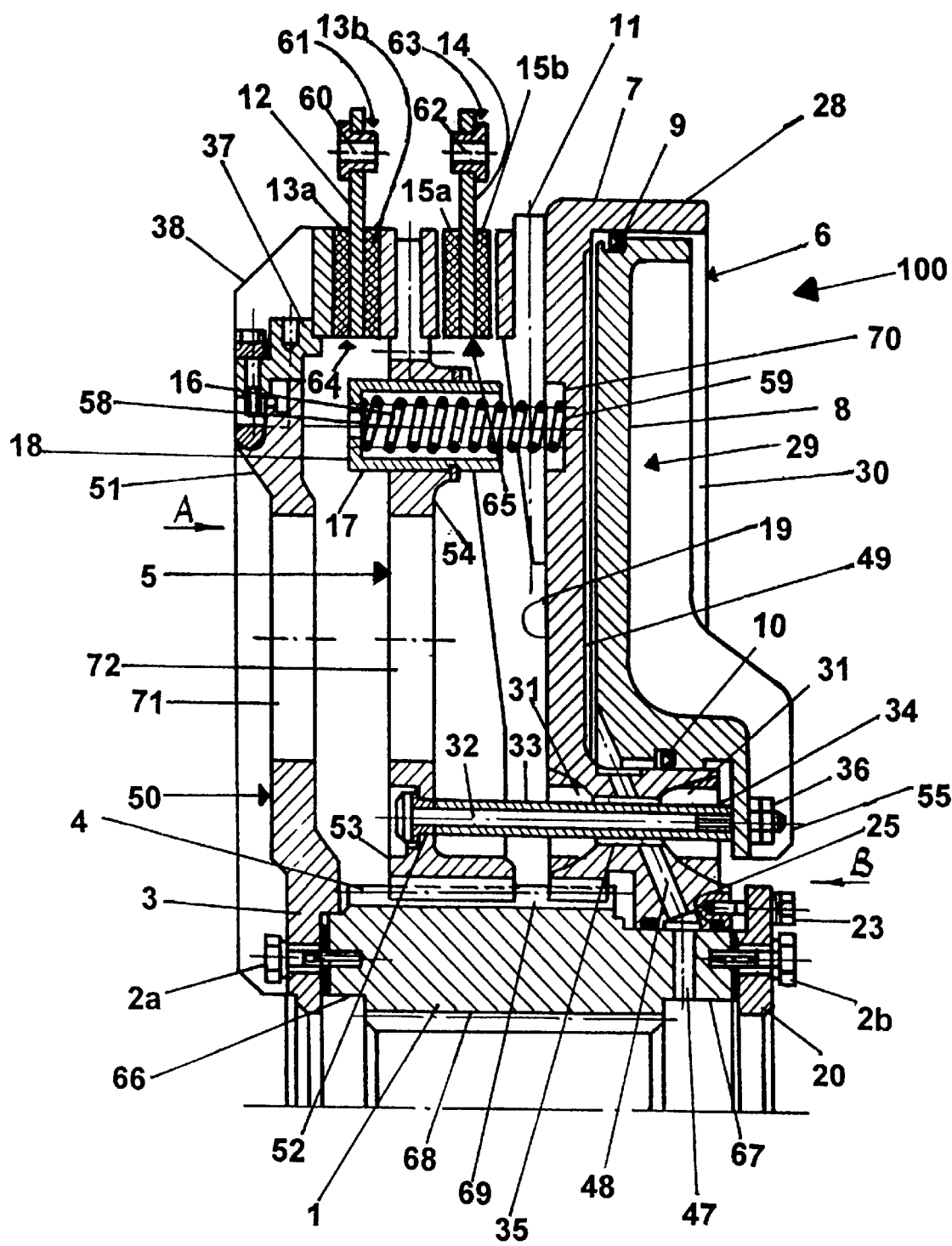
FIG. 1 is a cross-sectional side view of a representative portion of a preferred embodiment of the invented combined clutch and brake apparatus.
Figure 2:
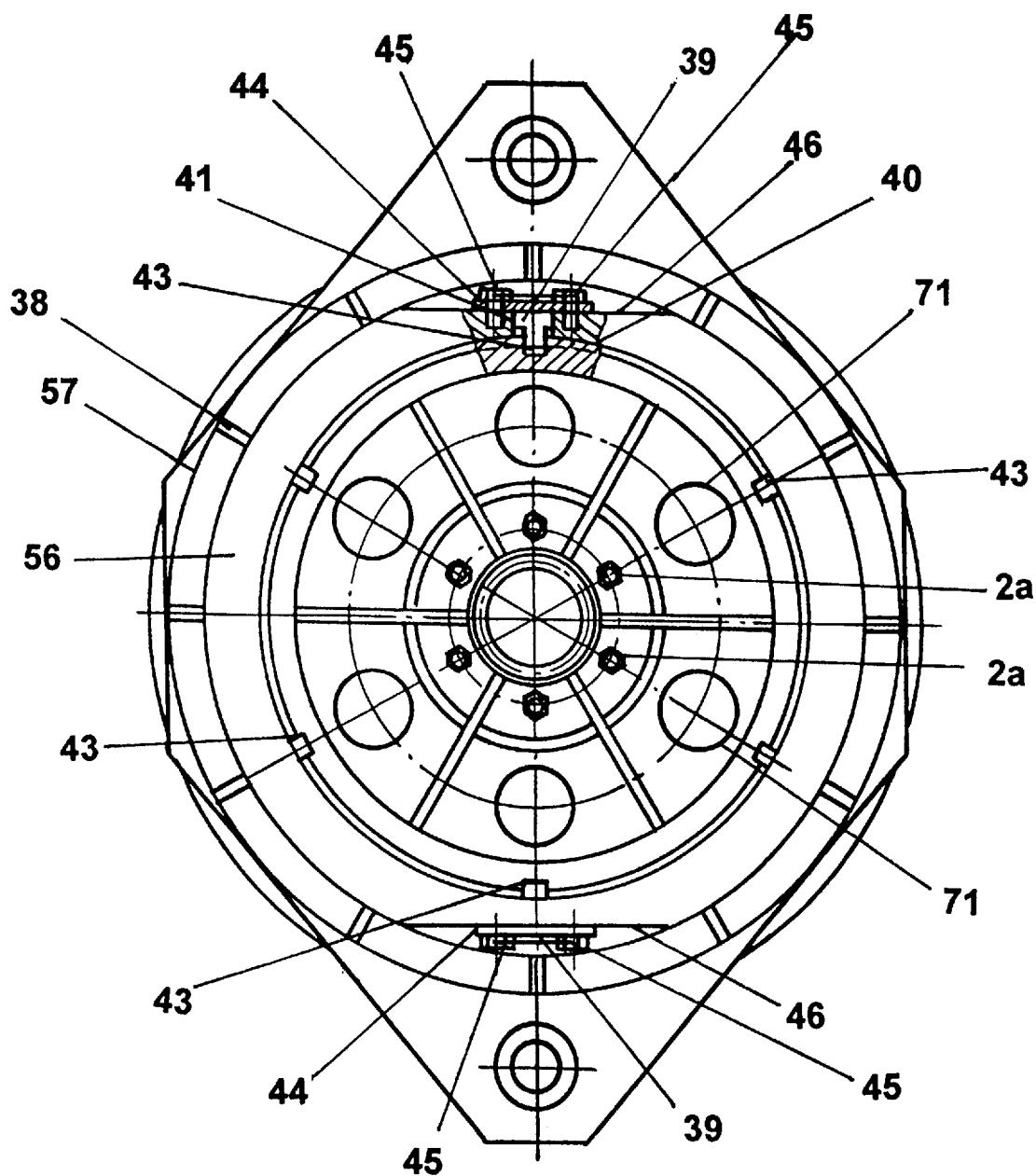
FIG. 2 is a perspective brake end view of the invented combined clutch and brake apparatus shown in FIG. 1.

Referring now to the drawings, and particularly to FIG. 1, the invented combined clutch and brake apparatus 100 includes a brake thrust disk 3 with ventilation holes 71, a pressure disk 5 with ventilation holes 72, a clutch thrust ring 11, and a pneumatic cylinder 6 kinematically connected to a hub 1. The hub 1 is non-rotatably mounted on a shaft (not shown) that is driven intermittently by the clutch.

The brake thrust disk 3 is mounted on a first end 66 of the hub 1. The brake thrust disk 3 is secured to the hub 1 by first hub screws 2a. The pneumatic cylinder 6 is mounted on a second end 67 of the hub 1 opposite the brake thrust disk 3. The pressure disk 5 is positioned between the brake thrust disk 3 and the pneumatic cylinder 6 and mounted in a central region 68 of the hub 1. The pressure disk 5 is movable along splines 4 on an outer surface 69 of the hub 1.

The pneumatic cylinder 6 includes a casing 7 which is movable along splines 4 on the outer surface 69 of the hub 1. The casing 7 has an annular cavity 30 opening in a direction opposite the pressure disk 5 and having ventilation holes 31 symmetrically spaced in a base 25 of the casing 7. The ventilation holes 31 provide cooling air to the friction zone of the invented combined clutch and brake apparatus 100.

A movable piston 8 is movably mounted in the annular cavity 30. The movable piston 8 is sealed in the annular cavity 30 at the base 25 of the casing 7 by a second sealing collar 10 and at a distal end 28 of the casing 7 by first sealing collar 9. The piston 8 forms an exterior face of the invented combined clutch and brake apparatus 100.

Between the movable piston 8 and the casing 7 is an internal space. The hub 1 has openings 47 through which compressed air passes into channels 48 in the base 25 of the casing 7. The compressed air is then fed into the internal space 49 of the pneumatic cylinder 6. Feeding compressed air into the pneumatic cylinder 6 actuates the movable piston 8.

The casing 7 of the pneumatic cylinder 6 is positioned on the hub 1 such that the body can move axially along the splines 4. The pneumatic cylinder 6 can therefore change its position relative to the hub 1. A thrust disk 20 is used to secure the casing 7 of the pneumatic cylinder 6 to the second end 67 of the hub 1. The thrust disk 20 is secured to the hub 1 by second hub screws 2b.

Figure 3:
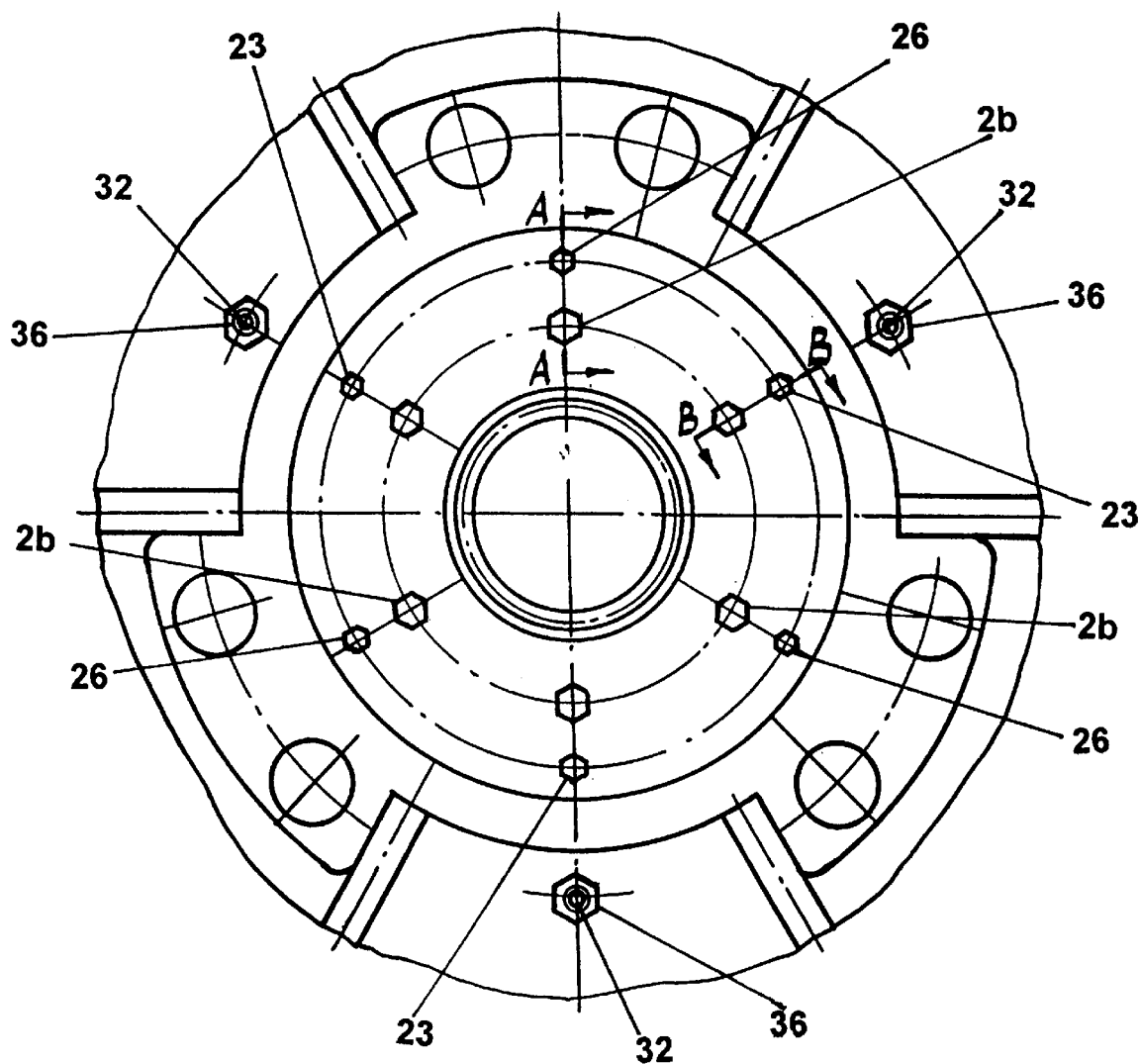
FIG. 3 is a perspective piston end view of the invented combined clutch and brake apparatus shown in FIG. 1.
Figure 4:
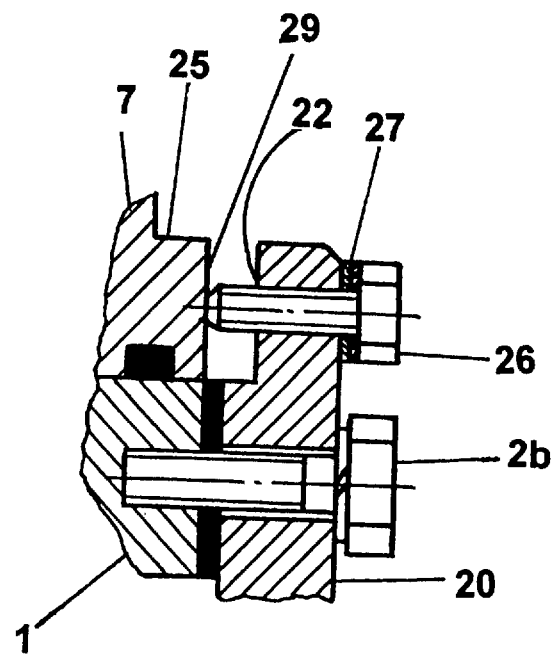
FIG. 4 is a detailed cross-sectional side view of the connection between a hub, a base of a pneumatic cylinder casing, and a thrust ring taken along line A—A in FIG. 3.
Figure 5:
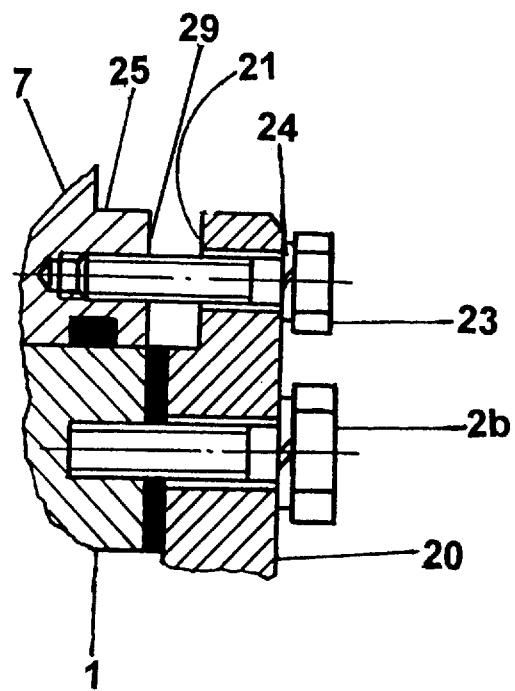
FIG. 5 is a detailed cross-sectional side view of the connection between the hub, the base of the pneumatic cylinder casing, and the thrust ring taken along line B—B in FIG. 3.

Referring now to FIGS. 3, 4 and 5, the thrust disk 20 has an outer ring of holes symmetrically spaced which alternate between a thrust disk smooth openings 21 and a thrust disk threaded openings 22. As shown in FIG. 5, first thrust ring bolts 23 are inserted through the smooth openings 21. Spring washers 24 are positioned between the heads of the first thrust ring bolts 23 and the thrust disk 20. The first thrust ring bolts 23 extend into an external surface 29 of the casing 7 of the pneumatic cylinder 6.

As shown in FIG. 4, second thrust ring bolts 26 are inserted through the threaded openings 22. Gage adjustment washers 27 are positioned between the heads of the second thrust ring bolts 26 and the thrust disk 20. The second thrust ring bolts 26 abut the external surface 29 of the casing 7 of the pneumatic cylinder 6.

Referring again to FIG. 1, a clutch thrust ring 11 is attached to an internal surface 19 of the casing 7 of the pneumatic cylinder 6. A clutch friction ring 14 is positioned between the clutch thrust ring 11 and the pressure disk 5. A brake friction ring 12 is positioned adjacent the clutch friction ring 14 between the pressure disk 5 and the brake thrust disk 3.

First pins (not shown) are placed through holes 60 in a distal region 61 of the brake friction ring 12 and are attached to the frame (not shown) of the machine in which the invented combined clutch and brake apparatus 100 operates. The first pins allow the ring 12 to move axially and prevent the ring 12 from moving radially. Second pins (not shown) are also placed through holes 62 in a distal region 63 of the clutch friction ring 14 and are attached to the rotatable or accelerating parts. The second pins also allow the ring 14 to move axially and prevent the ring 14 from moving radially.

First brake friction elements 13a are positioned on a proximal region 64 of the brake friction ring 12 adjacent to the brake thrust disk 3. Second brake friction elements 13b are positioned on the proximal region of the brake friction ring 12 adjacent to the pressure disk 5.

First clutch friction elements 15a are positioned on a proximal region 65 of the clutch friction ring 14 adjacent to the pressure disk 5. Second friction element 15b are positioned on the proximal region of the clutch friction ring 14 adjacent to and the clutch thrust ring 11.

The pressure disk 5 includes cups 17 spaced apart and positioned in a region 54 intermediate the central and outer portions of the pressure disk 5 below the friction elements 13, 15. The cups 17 have a closed end 18 and open toward the pneumatic cylinder 6. Braking springs 16 are positioned in the cups 17. Each braking spring 16 is supported at a first end 58 by the closed end 18 of the cup 17. A second end 59 of each braking spring 16 engages recesses 70 in the internal surface 19 of the casing 7 of the pneumatic cylinder 6.

During operation, the friction elements 13 and 15 become worn and the stroke of the piston 8 must be adjusted accordingly. The adjustment is accomplished by use of bolts 32 installed through the pressure disk 5 and into the pneumatic cylinder 6. Preferably, each of three bolts 32 are inserted through one of three holes 52 symmetrically spaced in a base 53 of the pressure disk 5. The holes 52 allow the head of the bolts 32 to be positioned completely within the width of the pressure disk 5. The bolts 32 pass through the ventilation holes 31, through holes 35 in the base 25 of the casing 7, and through a proximal region 55 of the piston 8. Gage adjustment washers 34 are positioned on the bolts 32 in a gap between the base 25 of the casing 7 and the piston 8. The bolts 32 are secured by check-nuts 36 positioned on the piston 8 opposite the gage adjustment washers 34. Each bolt 32 is surrounded by a gage sleeve 33 which extends from the head of the bolt 32 to the gage adjustment washers 34.

The wearing of the friction elements 13 and 15 creates clearances between the friction elements 13 and 15 and their corresponding surfaces. A means is therefore provided for the stepless adjustment of the disks to eliminate the clearances and to keep the friction elements 13 and 15 in contact with their corresponding surfaces.

The unit for stepless adjustment of clearances between the frictional disks 12 and 14, and also between the disks 5 and 11, includes an adjustment nut 37 with stiffening ribs 38 on its circumference 57. The nut 37 is installed on the distal end 51 at the external side 50 of the brake thrust disk 3, and the device for locking the adjustment nut 37 to prevent it from turning around the axis is made, for example, as two T-shaped stops 39. The stops 39 are installed diametrically opposite to each other on the external side surface 56 of the nut 37.

The vertical cylindrical part 40 of the stop is installed in a radial opening 41 made in the adjustment nut 37. The specially made lower end 42 of the stop 39 interacts with the same profile surfaces of one of the symmetrical grooves 43 located in a circular pattern on the external side surface 50 of the thrust disk 3 of the brake. The horizontal part 44 of the T-shaped stop 39 is rigidly attached by means of bolts 45 to a platform 46 made on the external side surface 56 of the adjustment nut 37.

In operation, the invented combined clutch and brake apparatus 100 works as follows. After a signal, compressed air is fed through the openings 47 in the hub 1, through the channels 48 in the base 25 of the pneumatic cylinder casing 7 and into the cylinder internal space 49 between the cylinder casing 7 and the movable piston 8. The compressed air causes the piston 8 to move axially away from the casing 7.

As the piston 8 moves away from the casing 7, the bolts 32, gage sleeves 33, the washers 34, and the check-nuts 36 connecting the pneumatic cylinder 6 and the pressure disk 5 force the pressure disk 5 toward the clutch thrust ring 11. As a consequence, braking spring 16 is compressed between the casing 7 and the pressure disk 5. At the same time, the pressure disk 5 moves axially away from the second brake friction elements 13b on the brake friction ring 12 thereby releasing the brake. As the pressure disk 5 continues moving axially toward the casing 7, the pressure disk 5 presses against the first clutch friction elements 15a on the clutch friction ring 14 causing the second clutch friction elements 15b to press against clutch thrust ring 11 thereby engaging the clutch.

As compressed air is released from the internal space between the casing 7 and the movable piston 8, the braking springs 16 force the pressure disk 5 axially away from the casing 7. Consequently, the pressure disk 5 releases the second clutch friction elements 15b on the clutch friction ring 14 from engagement with the clutch thrust ring 11 thereby releasing the clutch. Furthermore, the braking springs 16 force the pressure disk 5 axially toward the brake thrust disk 3 causing the first brake friction elements 13a to press against the brake thrust disk 3 thereby engaging the brake to slow down the driven parts of the invented combined clutch and brake apparatus 100 and to end their rotation.

When the machine is again operated, the above described operation is repeated.

Because friction elements 13 and 15 wear out during operation of the invented combined clutch and brake apparatus 100, stepless adjustments must be made to the clearances between the brake friction ring 12 and the brake thrust disk 3 and between the clutch friction ring 14 and the clutch thrust ring 11.

The present invention allows the stepless adjustments to be made from either the clutch end or the brake end or simultaneously from both ends of the engagement unit.

From the brake end, the clearances between the brake thrust disk 3 and the brake friction ring 12 can be adjusted as follows. First, the bolts 45 are unscrewed and the diametrically opposed T-shaped stops 39 are removed from the radial openings 41. The lower ends 42 of the T-shaped stops 39 are removed from one of the grooves 43. Next, the adjustment nut 37 is rotated as far as required to adjust the clearances between the brake thrust disk 3 and the brake friction ring 12. The T-shaped stops 39 are reinstalled in the external side surface 56 of the adjustment nut 37 and positioned in the radial openings 41 such that the lower ends 42 of the stops 39 enter one of the grooves 43. The bolts 45 are then screwed into place.

From the clutch end, the clearances between the clutch thrust ring 11 and the brake friction ring 14 can be adjusted as follows. First, the three first thrust ring bolts 23 are loosened and the three second thrust ring bolts 26 are unscrewed from the threaded openings 22. Next, gage adjustment washers 27 are removed from between the heads of the bolts 26 and the thrust ring 20. The three second thrust ring bolts 26 are then screwed into the threaded openings 22 until their free ends abut the external surface 29 of the casing 7 of the pneumatic cylinder 6.

When a set of gage adjustment washers 27 are removed, the bolts 23 and 26 move the casing 7 closer to the pressure disk 5 at a distance equal to the thickness of the washers 27 removed from the bolts 26. As a result, the distance between the pressure disk 5 and the clutch thrust ring 11 is reduced and the clearances between the first clutch friction elements 15a and the pressure disk 5 and the clearances between the second clutch friction elements 15b and the clutch thrust ring 11 and disks are adjusted.

Often it is necessary to adjust the axial travel of the piston 8 in the annular cavity 30 of the casing 7 of the pneumatic cylinder 6. The present invention allows the axial travel of the piston 8 to be adjusted by removing the check-nuts 36 from the bolts 32. Adjustment washers 34 can then be removed or added as necessary. The check-nuts 36 are then replaced on the bolts 32. Removing adjustment washer 34 reduces the distance between the piston 8 and the pressure disk 5 thereby decreasing the length the piston 8 can travel axially away from the pressure disk 5.

SUMMARY OF THE ACHIEVEMENT OF THE OBJECTS OF THE INVENTION

From the foregoing, it is readily apparent that we have invented an improved combined clutch and brake apparatus having increased reliability and safety and an increased service life.

By providing a pneumatic cylinder having a movable piston positioned in an annular cavity in the casing of the cylinder where the movable piston forms an exterior face of the invented combined clutch and brake apparatus, the present invention allows easy access to perform a fast replacement of worn out sealing collars in the pneumatic cylinder.

The present invention also provides a means for simple time-saving stepless adjustment of clearances between the friction elements and the clutch and brake disks caused by wear to the friction elements.

Similarly, the distance that the movable piston will travel can be efficiently adjusted as desired.

Further, the present invention allows a failed sealing collar to be replaced efficiently.

As a consequence, the present invention allows the clearances between the friction elements and the clutch and brake disks and the distance that the movable piston will travel to be serviced in less than 3 minutes. The present invention is an apparatus than operates more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A combined clutch and brake apparatus, comprising:
   a hub non-rotatably mountable on a shaft that is driven intermittently;
   said hub having a first end and a second end;
   a brake thrust disk secured on said first end of said hub;
   a pneumatic cylinder positioned on said second end of said hub comprising:
   a casing slidably mounted on said second end of said hub;
   said casing having a base, a distal end, an internal surface adjacent said brake thrust disk, and an annular cavity opening opposite said brake thrust disk;
   a movable piston movably mounted in said annular cavity;
   a first sealing collar positioned between said piston and said distal end of said casing; and
   a second sealing collar positioned between said piston and said base of said casing;
   a pressure disk slidably mounted on a central region of said hub;
   said pressure disk having a proximal region, a central region and a distal region;
   an elastic member between said pressure disk and said internal surface of said pneumatic cylinder;
   a clutch thrust ring positioned adjacent said internal surface of said casing;
   a brake friction ring positioned between said brake thrust disk and said pressure disk;

said brake friction ring having a first brake friction element engageable with said brake thrust disk and having a second brake friction element engageable with said pressure disk; and a clutch friction ring positioned between said pressure disk and said clutch thrust ring;

said clutch friction ring having a first clutch friction element engageable with said pressure disk and having a second clutch friction element engageable with said clutch thrust ring;

wherein said movable piston has an outer surface that forms an external face of the combined clutch-brake apparatus.

2. The combined clutch and brake apparatus of claim 1, wherein said clutch thrust ring is mounted on said internal surface of said casing.

3. The combined clutch and brake apparatus of claim 1, wherein said brake thrust disk further comprises brake thrust disk ventilation holes for providing ventilation to the combined clutch-brake apparatus.

4. The combined clutch and brake apparatus of claim 3, wherein said brake thrust disk ventilation holes are cylindrical openings symmetrically spaced in a central region of said brake thrust disk.

5. The combined clutch and brake apparatus of claim 1, wherein said pressure disk further comprises pressure disk ventilation holes for providing ventilation to the combined clutch-brake apparatus.

6. The combined clutch and brake apparatus of claim 5, wherein said pressure disk ventilation holes are cylindrical openings symmetrically spaced in said central regions of said pressure disk.

7. The combined clutch and brake apparatus of claim 1, wherein said brake thrust disk is secured to said hub by first hub screws.

8. The combined clutch and brake apparatus of claim 1, wherein said hub has axial splines for allowing guided axial movement of said pressure disk and said casing of said pneumatic cylinder.

9. The combined clutch and brake apparatus of claim 1, wherein said pressure disk has at least one cup positioned in the outer region of said pressure disk and wherein said cup has a closed end adjacent said brake thrust disk and an open end adjacent said pneumatic cylinder.

10. The combined clutch and brake apparatus of claim 9, wherein said internal surface of said casing further comprises at least one recess corresponding to said at least one cup and wherein said elastic member further comprises at least one braking spring having a first end mounted in said closed end of said cup and having a second end mounted in a recess in said internal surface of said casing.

11. The combined clutch and brake apparatus of claim 10, wherein said at least one cup further comprises three cups symmetrically spaced in said outer region of said pressure disk, wherein said at least one braking spring further comprises three braking springs, wherein said at least one recess further comprises three recesses in said internal surface of said casing, and wherein each braking spring is mounted between a cup and a corresponding recess.

12. The combined clutch and brake apparatus of claim 1, further comprising a means for friction element adjustment of clearances caused by friction element wear.

13. The combined clutch and brake apparatus of claim 12, wherein said brake thrust disk further comprises:

an outer surface; and grooves symmetrically spaced in a circular pattern on said outer surface of said brake thrust disk.

14. The combined clutch and brake apparatus of claim 13, wherein said means for friction element adjustment of clearances further comprises:

an adjustment nut for adjusting the clearances between said brake thrust disk and said first brake friction element on said brake friction ring;

said adjustment nut positioned on said outer surface of said brake thrust disk;

said adjustment nut having a platform formed on the external side surface of said adjustment nut;

said adjustment nut having a radial opening; and a T-shaped stop for preventing axial rotation of said adjustment nut;

said T-shaped stop having a horizontal part rigidly attached to said platform by bolts and having a vertical part passing through said radial opening in said adjustment nut;

said vertical part of said stop having a lower end positioned in one of said grooves.

15. The combined clutch and brake apparatus of claim 13, wherein said means for friction element adjustment of clearances further comprises:

a second T-shaped stop diametrically opposed to said first T-shaped stop for securing said adjustment nut into one of said grooves;

wherein said T-shaped stop is secured to a second platform formed in a second end of said adjustment nut.

16. The combined clutch and brake apparatus of claim 12, wherein said means for friction element adjustment further comprises:

a thrust ring mounted to said second end of said hub;

said thrust ring having smooth openings and threaded openings;

first thrust ring bolts positioned in said smooth openings and extending into said base of said casing;

second thrust ring bolts positioned in said threaded openings and abutting said base of said casing; and gage adjustment washers positioned on said second thrust ring bolts between a head of the second thrust ring bolt and said thrust ring;

wherein removing gage adjustment washers from said second thrust ring bolts reduces the clearances between said first clutch friction element and said clutch thrust ring and between said second clutch friction element and said pressure disk.

17. The combined clutch and brake apparatus of claim 16, further comprising second hub screws for connecting said thrust ring to said second end of said hub.

18. The combined clutch and brake apparatus of claim 16, wherein:

said smooth openings are three smooth openings symmetrically spaced on said thrust ring;

said threaded openings are three threaded openings symmetrically spaced on said thrust ring;

said smooth openings alternate with said threaded openings;

said first thrust ring bolts are three first thrust ring bolts;

said second thrust ring bolts are three second thrust ring bolts; and said gage adjustment washers must be removed in equivalent numbers from each of said three second thrust ring bolts to reduce the clearances between said first clutch friction element and said clutch thrust ring and between said second clutch friction element and said pressure disk.

19. The combined clutch and brake apparatus of claim 1, further comprising a means for piston stroke adjustment not requiring disassembly of the combined clutch and brake apparatus.

20. The combined clutch and brake apparatus of claim 19, wherein said means for piston stroke adjustment further comprises:
   a hole in said base of said pressure disk;
   a bolt having a head and a bolt shaft having a threaded end;
   a pneumatic cylinder ventilation hole in said base of said casing; and
   an opening in a proximal region of said movable piston;
   wherein said bolt is positioned in said hole in said base of said pressure disk such that said head of said bolt abuts edges of said hole in said pressure disk;
   wherein said bolt shaft extends through said pneumatic cylinder ventilation hole and through said opening in said proximal region of said movable piston; and
   wherein said threaded end extends beyond said casing.

21. The combined clutch and brake apparatus of claim 20, wherein said means for piston stroke adjustment further comprises:
   a check-nut mounted on said threaded end of said bolt exterior to said movable piston;
   a gage sleeve substantially surrounding said bolt shaft of said bolt between said head of said bolt and said movable piston; and
   at least one adjustment washer positioned on said bolt between said movable piston and said casing and said gage sleeve;
   wherein removing an adjustment washer reduces a distance between said piston and said pressure disk thereby decreasing the length said piston can travel axially away from said pressure disk.

22. The combined clutch and brake apparatus of claim 20, wherein said means for piston stroke adjustment further comprises:
   three holes symmetrically spaced in said proximal region of said pressure disk;
   three bolts;
   wherein each bolt has a head and a bolt shaft having a threaded end;
   three pneumatic cylinder ventilation holes symmetrically spaced in said base of said casing and aligned with said three holes in said base of said pressure disk; and
   three openings symmetrically spaced in said proximal region of said movable piston and corresponding to said three pneumatic cylinder ventilation holes;
   wherein said bolts are positioned in said holes in said base of said pressure disk such that each head of said bolts abuts edges of said holes in said pressure disk;
   wherein said bolt shafts extend through said pneumatic cylinder ventilation holes and through said openings in said proximal region of said movable piston; and
   wherein said threaded ends of said bolt shafts extend beyond said casing.

23. The combined clutch and brake apparatus of claim 22, wherein said means for piston stroke adjustment further comprises:
   a check-nut mounted on each of said three threaded ends of said bolts exterior to said movable piston;
   a gage sleeve substantially surrounding each of said bolt shafts of said bolts between said heads of said bolts and said movable piston; and
   an at least one adjustment washer positioned on each of said bolts between said movable piston and said casing and said gage sleeves;
   wherein an equivalent number of adjustment washers are mounted on each of said bolt shafts;
   and wherein removing an adjustment washer from each of said three bolts reduces a distance between said piston and said pressure disk thereby decreasing the length said piston can travel axially away from said pressure disk.

24. A combined clutch and brake apparatus, comprising:
   a hub non-rotatably mountable on a shaft that is driven intermittently;
   said hub having a first end and a second end;
   a brake thrust disk secured on said first end of said hub;
   a pneumatic cylinder positioned on said second end of said hub comprising:
      a casing slidably mounted on said second end of said hub;
      said casing having a base, a distal end, an internal surface adjacent said brake thrust disk, and an annular cavity opening opposite said brake thrust disk;
      a movable piston movably mounted in said annular cavity;
      wherein said movable piston has an outer surface that forms an external face of the combined clutch and brake apparatus;
      a first sealing collar positioned between said piston and said distal end of said casing; and
      a second sealing collar positioned between said piston and said base of said casing;
   a pressure disk slidably mounted on a central region of said hub;
   said pressure disk having a proximal region, a central region and a distal region;
   an elastic member between said pressure disk and said internal surface of said pneumatic cylinder;
   a clutch thrust ring positioned adjacent said internal surface of said casing;
   a brake friction ring positioned between said brake thrust disk and said pressure disk;
   said brake friction ring having a first brake friction element engageable with said brake thrust disk and having a second brake friction element engageable with said pressure disk;
   a clutch friction ring positioned between said pressure disk and said clutch thrust ring;
   said clutch friction ring having a first clutch friction element engageable with said pressure disk and having a second clutch friction element engageable with said clutch thrust ring;
   a means for friction element adjustment of clearances caused by friction element wear; and
   a means for piston stroke adjustment not requiring disassembly of the combined clutch and brake apparatus.

* * * * *